UNITED STATES PATENT OFFICE.

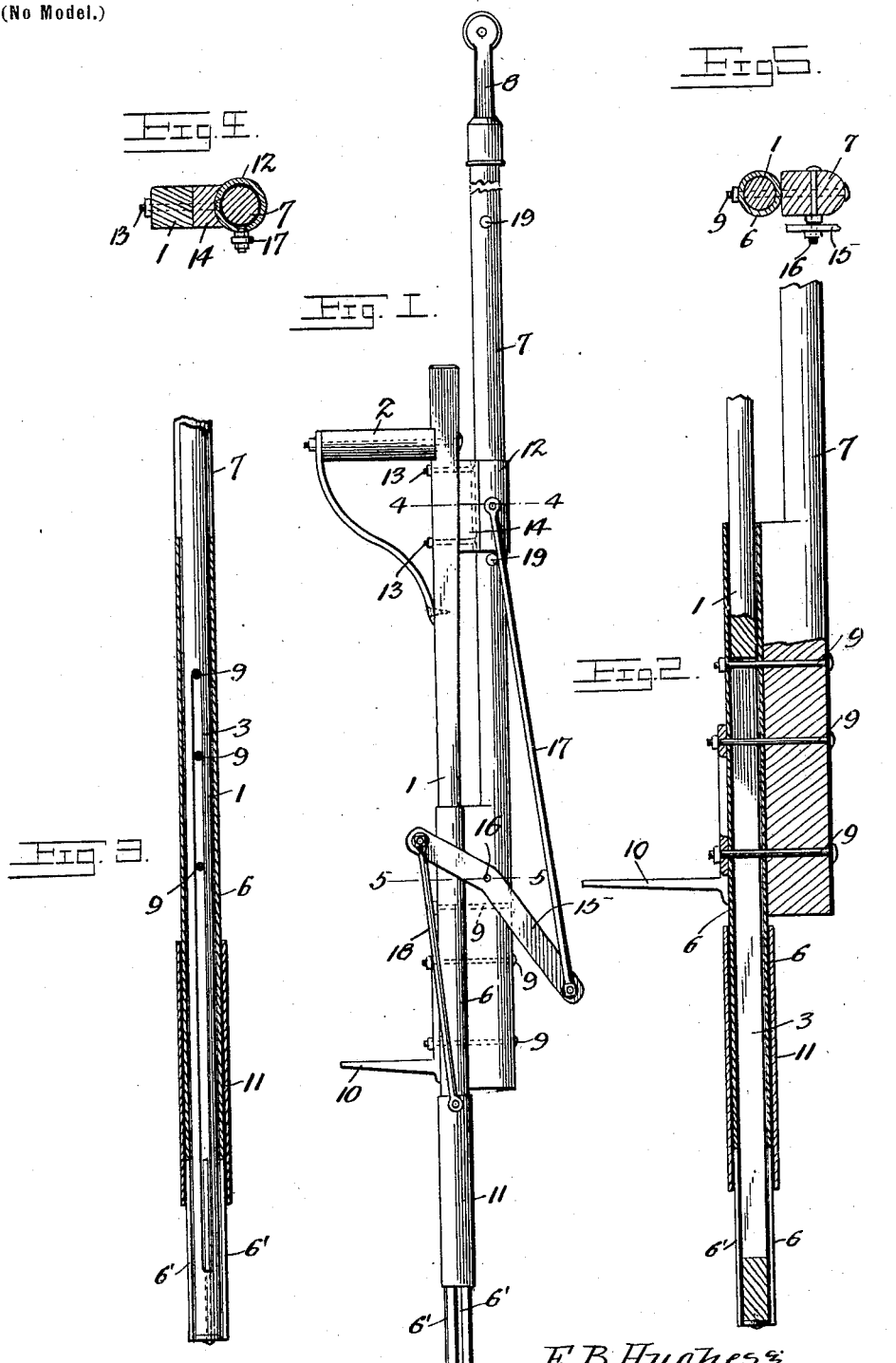

EDWARD B. HUGHES AND WILLIS F. CLOW, OF COLORADO SPRINGS, COLORADO.

DANDELION-EXTRACTOR.

SPECIFICATION forming part of Letters Patent No. 682,623, dated September 17, 1901.

Application filed June 20, 1901. Serial No. 65,343. (No model.)

*To all whom it may concern:*

Be it known that we, EDWARD B. HUGHES and WILLIS F. CLOW, citizens of the United States, residing at Colorado Springs, in the county of El Paso and State of Colorado, have invented a new and useful Dandelion-Extractor, of which the following is a specification.

Our invention is an improved tool by means of which dandelions and other noxious plants may be readily removed from a lawn, the object of our invention being to provide a light, cheap, and serviceable implement adapted for use in thoroughly withdrawing the noxious plants from the soil without injuring the appearance of the lawn; and it consists in the peculiar construction and combination of devices hereinafter fully set forth and claimed.

In the accompanying drawings, Figure 1 is a side elevation of a dandelion-extractor embodying our improvements. Fig. 2 is a detail sectional view of the same on a somewhat larger scale. Fig. 3 is a similar view taken on a plane at right angles to that of Fig. 2. Fig. 4 is a detail transverse sectional view taken on a plane indicated by the line 4 4 of Fig. 1. Fig. 5 is a similar view taken on a plane indicated by the line 5 5 of Fig. 1.

In the embodiment of our invention we provide a plunger 1 of cylindrical form, and to the upper end thereof we attach a handle 2, which projects from one side of the said plunger. The latter is provided with a vertical slot 3, which extends transversely therethrough for a purpose hereinafter described. The said plunger operates in a cylindrical barrel 6. The lower end of the said barrel is provided with vertical slots 6', whereby the lower end of the barrel may be contracted and expanded, as will be understood. An operating-rod 7, which is preferably of the form here shown and is provided at its upper end with a handle 8, has its lower end secured on one side of the upper end of the barrel 6 by bolts 9, which extend transversely through the barrel and through the slot 3 in the plunger. A foot-rest 10 is secured also to the said barrel on the side opposite the operating-rod 7 by certain of the bolts 9, as shown. On the lower portion of the barrel is a cylindrical sliding sleeve 11, the same being adapted to move upwardly and downwardly on the barrel. The upper end of the plunger 1 is connected to a guide-sleeve 12, which operates on the rod 7. As here shown, the said guide-sleeve 12 is connected to the said plunger 1 by bolts 13, a space-block 14 being interposed between the said guide-sleeve and the said plunger. A lever 15 is fulcrumed on one side of the operating-rod 7, near the lower end thereof, as at 16. A rod 17 connects one end of the said lever to the guide-sleeve 12. A similar rod 18 connects the opposite end of said lever to the sleeve 11.

The operation of our invention is as follows: Initially the rod 7 is depressed, thereby lowering the sleeve 11 on the lower portion of the barrel through the connections 16 17 18. The operator places the lower end of the barrel with the sleeve thereon on a dandelion or other plant to be extracted and forces the same downwardly into the earth by pressing downwardly on the handle 8 or the foot-rest 10, or both, thereby causing the lower end of the barrel and the sleeve to enter the earth and cut a core of soil in which is the plant, the core as it is cut expanding the lower slotted end of the barrel in the sleeve 11, which forms the sheath thereof, and hence the core is so firmly held in the barrel that when the latter is withdrawn the core is drawn up out of the soil. The rod 7 is then manipulated to cause the sleeve 11 to ascend on the slit or slotted lower end of the barrel to release the lower slotted end of the barrel. The plunger is by said movement of the rod 7 simultaneously operated to force the core of soil containing the extracted plant out of the lower end of the barrel, as will be readily understood.

We do not desire to limit ourselves to the precise construction and combination of devices hereinbefore described, as it is evident that modifications may be made therein without departing from the spirit of our invention.

The slot 3 and bolts 9 while permitting of the movement of the plunger in the barrel also serve as stops to limit the movement of the plunger in the barrel. Stop pins or studs 19 may also, as shown in Fig. 1, be provided on the operating-rod 7 to limit the play of the guide-sleeve 12 thereon.

Having thus described our invention, we claim—

1. In an implement of the class described, the combination of a barrel having its lower end slotted, a plunger therein, and a movable sleeve on the said barrel, for the purpose set forth and means to operate said sleeve, substantially as described.

2. In an implement of the class described, the combination of a barrel, a plunger therein having a handle, said plunger having a longitudinal slot, an operating-rod bolted to said barrel, the bolts which secure said barrel to said rod passing through the slot in the plunger, and a foot-rest secured to said barrel by said bolts, substantially as described.

3. In an implement of the class described, the combination of a barrel, a plunger therein, an operating-rod attached to the barrel, a lever fulcrumed to said operating-rod and connections between said lever and said plunger, a sleeve on said barrel, said sleeve being connected to and operated by said lever, substantially as described.

4. In an implement of the class described, the combination of a barrel having the lower end split and thereby adapted to be contracted and expanded, a plunger in said barrel, said plunger being adapted to be operated manually, an operating-rod attached to said barrel, a sleeve ensheathing the lower portion of the barrel and movable longitudinally thereon, a guide fixed to the plunger and in which the operating-rod moves, a lever fulcrumed to said operating-rod, and links connecting said lever at points on opposite sides of its fulcrum to said sleeve and guide respectively, substantially as described.

In testimony that we claim the foregoing as our own we have hereto affixed our signatures in the presence of two witnesses.

EDWARD B. HUGHES.
WILLIS F. CLOW.

Witnesses:
 WM. E. HOOK, Jr.,
 W. R. McCOY.